United States Patent

Borg

[11] Patent Number: 4,653,776
[45] Date of Patent: Mar. 31, 1987

[54] UMBILICAL SAFETY JOINT
[75] Inventor: Jeffrey E. Borg, Houston, Tex.
[73] Assignee: Multiflex International, Inc., Magnolia, Tex.
[21] Appl. No.: 837,265
[22] Filed: Mar. 7, 1986
[51] Int. Cl.[4] .............................................. F16L 55/00
[52] U.S. Cl. ............................................ 285/2; 285/1;
166/54.5; 166/363
[58] Field of Search ................. 285/1, 2, 3, 4; 403/2;
166/54.5, 363; 137/68.1

[56] References Cited

U.S. PATENT DOCUMENTS

| | | | |
|---|---|---|---|
| 1,540,169 | 6/1925 | Dymond | 166/54.5 |
| 2,072,341 | 3/1937 | McCullough . | |
| 2,825,536 | 7/1956 | Kenneday et al. . | |
| 2,919,111 | 12/1959 | Nicolson | 166/363 |
| 3,517,740 | 6/1970 | Johnson . | |
| 3,590,920 | 7/1971 | Orund et al. | 166/363 |
| 3,870,098 | 3/1975 | Houston | 166/363 |
| 3,915,196 | 10/1975 | Bergman | 137/68.1 |
| 3,926,252 | 12/1975 | Ribeyre et al. . | |
| 4,109,713 | 8/1978 | Clow | 137/68.1 |
| 4,160,478 | 7/1979 | Calhoun et al. | 166/363 |
| 4,237,972 | 12/1980 | Lanmon, II . | |
| 4,306,622 | 12/1981 | Armstrong . | |
| 4,512,411 | 4/1985 | Pringle | 166/54.5 |

*Primary Examiner*—Richard J. Scanlan, Jr.
*Assistant Examiner*—Douglas W. Hanson
*Attorney, Agent, or Firm*—Pravel, Gambrell, Hewitt & Kimball

[57] ABSTRACT

A safety joint for a control umbilical which separates the umbilical and severs internal control hoses when a predetermined tension is exceeded. The control hoses are severed by opposing cutting edges on mating slots formed by an inner cutting tube and an outer cutting tube which separate when the sfety joint separates. The safety joint can be installed at any point along the control umbilical without cutting the control hoses during installation.

10 Claims, 3 Drawing Figures

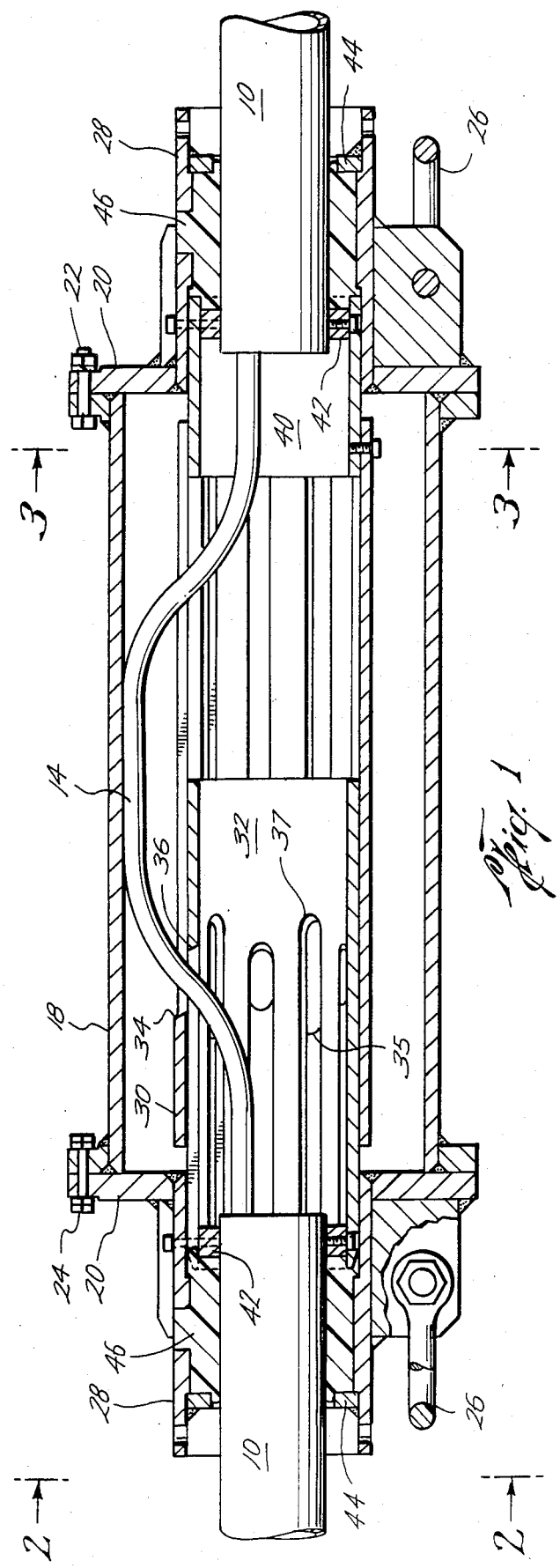
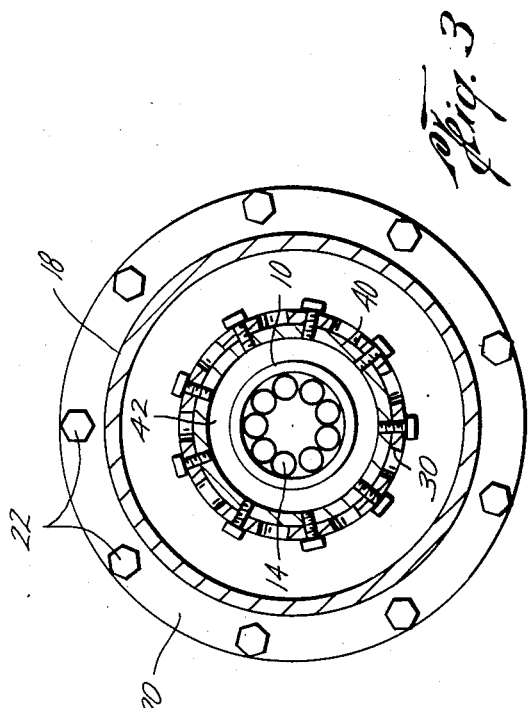
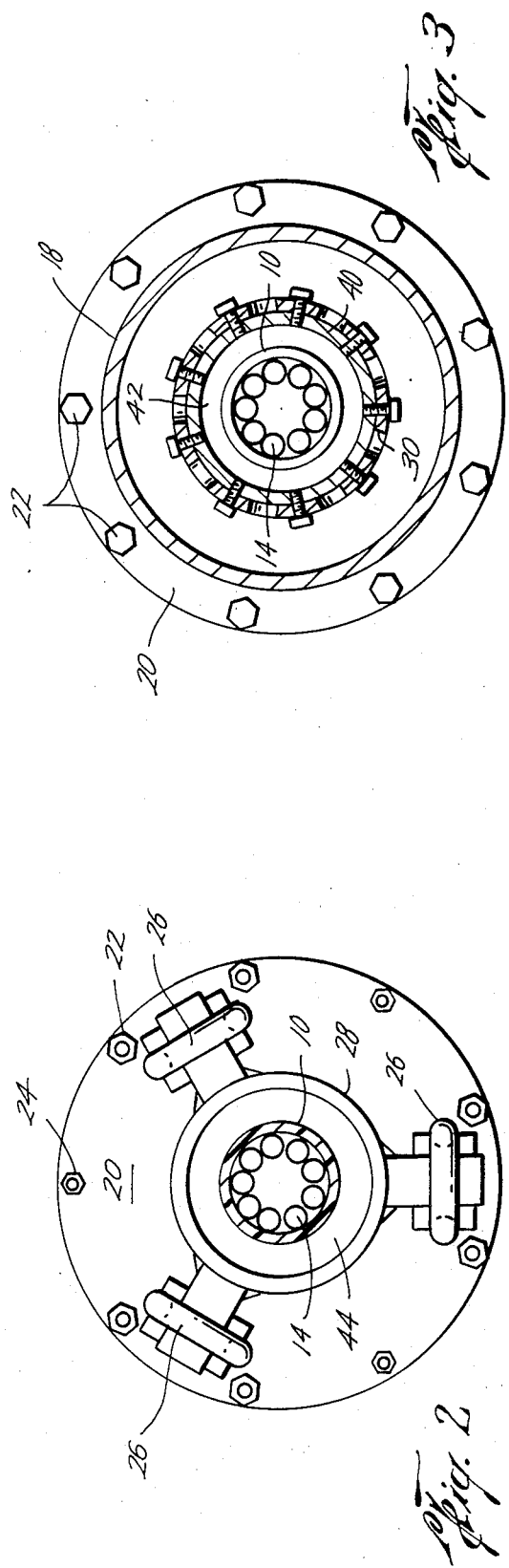

UMBILICAL SAFETY JOINT

FIELD OF THE INVENTION

The present invention relates to a safety joint that separates a control umbilical at a predetermined point when a predetermined tension is exceeded. More particularly, the invention relates to an umbilical safety joint that forms a weak link in the control umbilical and severs control hoses contained in the umbilical when the tension breaks the weak link.

BACKGROUND OF THE INVENTION

A subsea control umbilical may be employed to connect remotely positioned subsea satellite production and/or injection christmas trees to subsea template controls or to surface controls on a platform loading production vessel. Subsea control umbilicals are also employed to connect several small subsea templates together before ascending to the surface platform or vessel. A riser bundle or umbilical can include up to eighteen separate control hoses within a casing. The casing may include an armor outer surface to protect the enclosed control hoses. The umbilicals are usually supported by wire cables for strength.

The distances between subsea systems may range from a few hundred feet to as much as ten to twenty miles. The subsea control umbilical connecting subsea christmas trees and templates together are subject to damage by vessel mooring lines and anchors, fishing vessels using trawling boards, subsea mudslides and ocean floor drift. The most common damage to such subsea systems is caused by mooring lines or anchors snagging the subsea control umbilical and supporting cables and pulling against the christmas tree, template termination or riser base. The loads on such subsea systems are extreme when the subsea control umbilical and supporting cables are snagged by anchors and pulled away. The breaking strength of the umbilical armor and supporting cables may range from 30,000 pounds to 80,000 pounds, depending upon the wire gauge and material strength, and is more than enough to cause severe damage to the subsea systems.

The riser bundle or umbilical preferably includes a safety joint which will separate when a predetermined tension on the umbilical is exceeded. Typically such safety joints employ "weak link" bolts as connection means which are designed to break when a predetermined tension is exceeded to allow separation of the armor casing and the support cables. Upon separation of the weak link bolts, the inner control hoses are typically allowed to break under the tension. Often, the control hose connections can be damaged during such tension failure. Further, the separation of the control hoses due to such tension failure is not a predictable occurrence and control hose segments other than in the area of eventual failure can be weakened by stretching.

SUMMARY OF THE INVENTION

The present invention is an umbilical safety joint, for protecting subsea systems, which can be installed at any point on a riser bundle or subsea umbilical without cutting the control hoses, and which provides for separation of umbilical casing and supporting cables and for cutting of the enclosed control hoses upon overtensioning of the riser bundle or subsea umbilical. The hose cutter of the present invention comprises an outer cutting tube in sliding engagement with an inner cutting tube. The control hoses are passed through mating cutting slots in both cutting tubes such that separation of the tubes closes the slots and severs the control hoses.

Each cutting slot in the inner and outer cutting tubes extends to one end of the tube such that the control hoses can be inserted into the slots at any point along the length of the control hoses before the inner and outer cutting tubes are connected to form the mating outer cutting slots. Thus, the casing can be stripped from an umbilical at any point and the safety joint installed without cutting the control hoses during installation.

The cutting slots are preferably of different lengths such that all of the control hoses are not severed at the same time.

DESCRIPTION OF THE DRAWINGS

FIG. 1 is a side view of the umbilical safety joint of the present invention;

FIG. 2 is an end view taken along line 2—2 of FIG. 1;

FIG. 3 is a sectional view taken along line 3—3 of FIG. 1.

DESCRIPTION OF A PREFERRED EMBODIMENT

The umbilical safety joint of the present invention is adapted for orientation at any point on a control umbilical 10 for a subsea system. The control umbilical 10 can be a riser bundle, which extends from a surface vessel or platform to subsea equipment such as a wellhead assembly known as a christmas tree, or a subsea umbilical extending between subsea equipment. The control umbilical 10 contains control hoses 14, typically as many as eighteen, which supply hydraulic fluid under pressure to the control valves of the subsea equipment. Although only one hose 14 is shown in FIG. 1, it will be understood that a control umbilical 10 may have many hoses 14.

The umbilical safety joint includes a tubular casing 18 that is connected at both ends to termination bodies 20 by bolts 22 and weak link bolts 24. The weak link bolts 24 are preferably used at one end of the tubular casing 18 so that one of the termination bodies 20 will separate cleanly from the tubular casing 18. The number of weak link bolts 24 used to connect the termination body 20 to the tubular casing 18 depends on the desired strength of the safety joint. Three weak link bolts 24 are shown in FIG. 2 and more or less weak link bolts 24 could be used to alter the strength of the safety joint if desired.

Each termination body 20 includes shackles 26 for the attachment of any wire cables used to support the control umbilical 10. The termination body 20 has a tubular portion 28 for the passage of the control umbilical 10. The termination body 20 also may have means for securing the termination body 20 to armor coating when present on the control umbilical 10.

With the safety joint, the control umbilical 10 has been stripped of protective layers to expose the control hoses 14 which pass through mating slots in an outer cutting tube 30 and an inner cutting tube 32. One such control hose 14 is shown passing through mating slots having opposing cutting edges 34 and 36. Each slot in the outer cutting tube 30 and the inner cutting tube 32 extend from the cutting edge to one end of the cutting tubes. Preferably, the slots in each cutting tube vary in length as shown in FIG. 1 with respect to first opposing cutting edges 34 an 36 on first mating slots and second opposing cutting edges 35 and 37 on second mating slots. By varying the length of the mating slots, all of the hoses 14 are not cut at the same time when the mating slots are closed as described in the following paragraphs.

The outer cutting tube 30 is connected by screws or other fastening means to one end of a connecting sleeve 40 which fits within the tubular portion 28 of one of the termination bodies 20. The inner cutting tube 32 fits within the tubular portion 28 of the other termination body 20. Both the connecting sleeve 40 and the inner cutting tube 32 are connected by screws or other fastening means to retaining rings 42 which surround the control umbilical 10. The retaining rings are further connected by screws or other fastening means to the termination bodies 20. Thus, separation of the termination bodies 20 by the breaking of the weak link bolts 24 causes a separation of the outer cutting tube 30 and the inner cutting tube 32 such that the mating slots are closed and the opposing cutting edges sever the control hoses 14.

Sealing rings 44 are mounted in the tubular portions 28 of the termination bodies 20 to provide cementing chambers 46 between the sealing rings 44 and the retaining rings 42. The cementing chambers 46 are filled with a polyurethane resin or other bonding compounds to permanently attach the termination bodies 20 to the control umbilical 10 on both sides of the exposed control hoses 14.

In practice the umbilical safety joint of the present invention could be used at any point along a control umbilical 10. The tubular casing 18, the termination bodies 20, the retaining rings 42, the sealing rings 44, the connecting sleeve 40, and the outer cutting tube 30 can be inserted over a free end of the control umbilical 10 and pulled along the umbilical 10 to a desired installation point. At the desired point of installation, the protective layers of the umbilical cable 10 and any armor coating are stripped to expose the control hoses 14. The outer cutting tube 30 is then pulled over the exposed control hoses 14 and each control hose 14 is inserted into a slot in the outer cutting tube 30 such that the control hoses 14 remain outside the cutting tube 30 at the end of the slots opposite the cutting edges. The inner cutting tube 32 can then be inserted within the outer cutting tube 30 until the control hoses 14 are positioned in the mating slots.

The connecting sleeve 40 can then be fastened to the outer cutting tube 30 which requires the control hoses 14 to reenter the slots in the outer cutting tube 30. The connecting sleeve 40 and the inner cutting tube 32 are then fastened to the retaining rings 42 which are fastened to the termination bodies 20. The termination bodies 20 are then connected to the tubular casing 18 by bolts 22 and weak link bolts 24 as required to allow separation of the weak link bolts 24 at a predetermined tension. Sealing rings 44 are then inserted into the tubular portions 28 of the termination bodies 20 and resulting cementing chambers 46 are filled with a bonding compound such as polyurethane resin. Any supporting cables for the umbilical 10 can then be attached to the shackles 26 on the termination bodies 20.

Upon tensioning of the control umbilical 10 and supporting cables a predetermined amount sufficient to cause the weak link bolts 24 to fail, the termination body 20 having the weak link bolts 24 separates from the tubular casing 18 causing the separation of the outer cutting tube 30 and the inner cutting tube 32. As the cutting tubes separate, the opposing cutting edges on the mating slots sever the control hoses 14 resulting in a clean separation of the control umbilical 10. Severing of the control hoses 14 cuts off the supply of hydraulic fluid that opens the valves and other parts of the subsea christmas tree and thereby closes the valves to prevent loss of oil or gas from the well. Such cutting of the control hoses 14 prevents damage to the control hose connections on the christmas tree or other subsea systems.

The invention is readily adaptable as a safety joint for other uses involving multi-tubes or control hoses without departing from the spirit and scope of the invention.

What is claimed is:

1. A safety joint for cutting hoses in a control umbilical when a predetermined tension is exceeded, comprising:
   a first cutting member having a plurality of longitudinal slots extending from one end of the first cutting member to first cutting edges;
   a second cutting member having a plurality of longitudinal slots extending from one end of the second cutting member to second cutting edges;
   means for mounting the first and second cutting members to form a plurality of mating slots having the first and second cutting edges at opposing ends; and
   means for separating the first and second cutting members to sever hoses passing through the mating slots when a predetermined tension is applied to the control umbilical.

2. The safety joint of claim 1, wherein the first and second cutting members are inner and outer cutting tubes.

3. The safety joint of claim 2, wherein the longitudinal slots vary in length to form mating slots of varying length.

4. The safety joint of claim 1, wherein the means for mounting the first and second cutting members comprises:
   a tubular casing;
   first and second termination bodies connected to the ends of the tubular casing, each termination body having means for connecting the termination body to the control umbilical and any supporting wire cables;
   means for connecting the first cutting member to the first termination body; and
   means for connecting the second cutting member to the second termination body.

5. The safety joint of claim 4, wherein the means for separating the first and second cutting members comprises weak link bolts connecting the first termination body to the tubular casing.

6. A safety joint for cutting hoses in a hose bundle when a predetermined tension is exceeded, comprising:
   a tubular casing;
   a first termination body connected to one end of the tubular casing with weak link means;
   a second termination body connected to the other end of the tubular casing;
   an inner cutting tube having first longitudinal slots extending from one end of the tube to first cutting edges;
   an outer cutting tube having second longitudinal slots extending from one end of the tube to second cutting edges; and means for connecting the inner and outer cutting tubes to the first and second termination bodies to form mating slots having the first and second cutting edges at opposing ends such that the first and second cutting edges sever hoses passing through the mating slots when a predetermined tension breaks the weak link means.

7. The safety joint of claim 6, wherein the means for connecting the inner and outer cutting tubes comprises:
   a connecting sleeve having means to connect the outer cutting tube to the connecting sleeve; and
   means for connecting the inner cutting tube and the connecting sleeve to the first and second termination bodies.

8. The safety joint of claim 6, wherein the weak link means comprises weak link bolts.

9. The safety joint of claim 6, wherein the termination bodies includes means for connecting the bodies to the control umbilical and any supporting wire cables.

10. The safety joint of claim 6, wherein both the first and second longitudinal slots vary in length to form mating slots of varying length.

* * * * *